US012259099B2

(12) United States Patent
Kim

(10) Patent No.: US 12,259,099 B2
(45) Date of Patent: Mar. 25, 2025

(54) SHIELD FOR IMPROVING DARK PARTS AND PROJECTION HEADLAMP INCLUDING THE SAME

(71) Applicant: HYUNDAI MOBIS CO., LTD., Seoul (KR)

(72) Inventor: Hong Seok Kim, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/498,238

(22) Filed: Oct. 31, 2023

(65) Prior Publication Data

US 2024/0191855 A1 Jun. 13, 2024

(30) Foreign Application Priority Data

Dec. 13, 2022 (KR) ........................ 10-2022-0173622

(51) Int. Cl.

*F21S 41/39* (2018.01)
*F21S 41/24* (2018.01)
*F21S 41/275* (2018.01)
*F21S 41/47* (2018.01)
*F21W 102/20* (2018.01)

(52) U.S. Cl.

CPC ............. *F21S 41/275* (2018.01); *F21S 41/24* (2018.01); *F21S 41/39* (2018.01); *F21S 41/47* (2018.01); *F21W 2102/20* (2018.01)

(58) Field of Classification Search

CPC .......... F21S 41/43; F21S 41/40; F21S 41/692; F21S 41/365; F21W 2102/18; F21W 2107/10; F21W 2102/16; F21W 2102/155; F21W 2102/165; F21W 2102/20

See application file for complete search history.

(56) References Cited

U.S. PATENT DOCUMENTS

2010/0118559 A1* 5/2010 Nakada ................ F21S 41/148 362/539
2013/0343076 A1* 12/2013 Nakada ................ F21S 41/148 362/516

FOREIGN PATENT DOCUMENTS

JP 2001035218 A * 2/2001 .............. F21S 41/43
KR 20220091861 A 7/2022

OTHER PUBLICATIONS

Search English translation of JP-2001035218-A (Year: 2001).*

* cited by examiner

*Primary Examiner* — Omar Rojas Cadima
(74) *Attorney, Agent, or Firm* — NovoTechIP International PLLC

(57) ABSTRACT

A projection headlamp is provided including a shield disposed between the reflector and aspherical lens of the lamp to control light emission area of the headlamp. The projection headlamp includes a dark part improvement element configured to optimize a shield design to add some light to the dark part or advance light blocked for providing the dark part to a far-field part. This dark part improvement is advantageous for driving, thereby improving a driver's driving stability.

11 Claims, 8 Drawing Sheets

SHIELD FOR IMPROVING DARK PARTS AND PROJECTION HEADLAMP INCLUDING THE SAME

CROSS-REFERENCE TO RELATED APPLICATIONS

This application claims priority under 35 U.S.C. § 119 to Korean Patent Application No. 10-2022-0173622, filed on Dec. 13, 2022, in the Korean Intellectual Property Office, the disclosure of which is incorporated herein by reference in its entirety.

TECHNICAL FIELD

The following disclosure relates to a headlamp including a shield disposed between the reflector and aspherical lens of the lamp to control a light emission area.

BACKGROUND

In general, a vehicle may include a lighting device to stably secure a vehicle driver's view even when ambient illumination is low while driving, and in recent years, the vehicle has generally adopted a projection optical module using a light emitting diode (LED) light source.

This conventional projection optical module may include a shield between a reflector and an aspherical lens to thus resolve the driver's difficulty in recognizing a road traffic sign existing in an area above a reference horizon that is provided in front of a driving direction at night in a case where light emission to the corresponding area is completely blocked, and partially allow light emission to the area above the reference horizon in order for the driver to easily recognize the road traffic sign existing in the corresponding area provided in front of the driving direction without causing glare to drivers of preceding or opposing vehicles.

Here, a reflector shield including the reflector may allow some light to be emitted to the area above the reference horizon by partially reflecting light by the reflector positioned on the top of the shield, and an opening shield may allow some light to be emitted to the area above the reference horizon by allowing some light to pass through an opening positioned in the middle of the shield.

Here, light may be concentrated at a cut-off between an area where light is blocked by the shield and an area where light passes through to partially increase light intensity (of more than 40,000 candela). However, some countries (in North America, for example) enact a regulation restricting intensity of light emitted from a vehicle headlamp to 12,000 candela or less to prevent light pollution. Therefore, in order to satisfy the regulation, the prior art attempts to prevent light concentration by having a protrusion formed on a surface of the shield to intentionally provide a dark part on a cut-off surface.

However, it may be recognized by a driver that light is non-uniformly emitted from the intentional dark part area provided in this way, which may lower usability. Korean Patent Laid-Open Publication No. 10-2022-0091861 entitled "LED lamps used in projection lamp structure with opening shields and projection lamp structure replacing halogen lamps using the same" (published on Jul. 1, 2022) is an example of a related art document.

SUMMARY

An embodiment of the present disclosure is directed to providing a shield for improving dark parts which may optimize a shield design to add some light to the dark part or advance light blocked for providing the dark part to a far-field part advantageous for driving, thereby improving a driver's driving stability, and a projection headlamp including the same.

In one general aspect, provided is a shield for improving dark parts of a light emission area of a lamp, which is disposed between the reflector and aspherical lens of the lamp to control the light emission area, the shield including: a first shield part including a shield surface disposed at the same height as a focal height of the aspherical lens; a reflection part including a reflecting surface in contact with one end of the first shield part while having a predetermined angle with the shield surface; and a dark part improvement element (or means) configured to diffuse light to a predetermined generation area of the dark part in the light emission area.

The shield may further include a second shield part positioned on the shield surface and providing the dark part in the predetermined generation area of the dark part, and the dark part improvement means may include a light guide attached to the reflecting surface of the reflection part and having one end in contact with one end of the second shield part.

A maximum height of the light guide may be higher than the shield surface and lower than a maximum height of the second shield part.

The second shield part may have an incline formed on its side in contact with the light guide, and the one end of the second shield part and the one end of the light guide may have the same height.

A width of the light guide may be smaller than a width of the second shield part.

The dark part improvement means may include an additional shield coupled to the shield surface while having one end facing one side of the first shield part and the other end facing the other end of the first shield part, and a height of the one end may be lower than that of the other end.

The additional shield may have a triangular prism shape, and one of its side surfaces may be coupled to the shield surface.

The additional shield may have an angle between planes configuring its one of its end corners to be 10 degrees to 30 degrees.

The additional shield may have a width at a maximum height smaller than a width at a minimum height.

The one end of the additional shield may be spaced apart from one end of the shield surface by a predetermined distance, and the other end of the additional shield may match the other end corner of the shield surface.

In another general aspect, a projection headlamp includes: the shield for improving dark parts described above; a light source generating light; an aspherical lens transmitting light of the light source to the outside, and having a focal height which is the same as that of the shield surface; and a reflector receiving light from the light source, transmitting light to the aspherical lens, and including the shield for improving dark parts disposed between the reflector and the aspherical lens.

DETAILED DESCRIPTION

Hereinafter, the spirit of the present disclosure is described in detail with reference to the accompanying drawings. Terms and words used in the specification and claims are not to be construed as general or dictionary meanings, and are to be construed as meanings and concepts meeting the spirit of the present disclosure based on a principle that the inventors may appropriately define the concepts of terms in order to describe their inventions in best mode.

Hereinafter, the description describes basic configurations of a shield 1000 for improving dark parts and a projection headlamp 2000 including the same of the present disclosure with reference to FIGS. 1 and 2.

Figure 1:
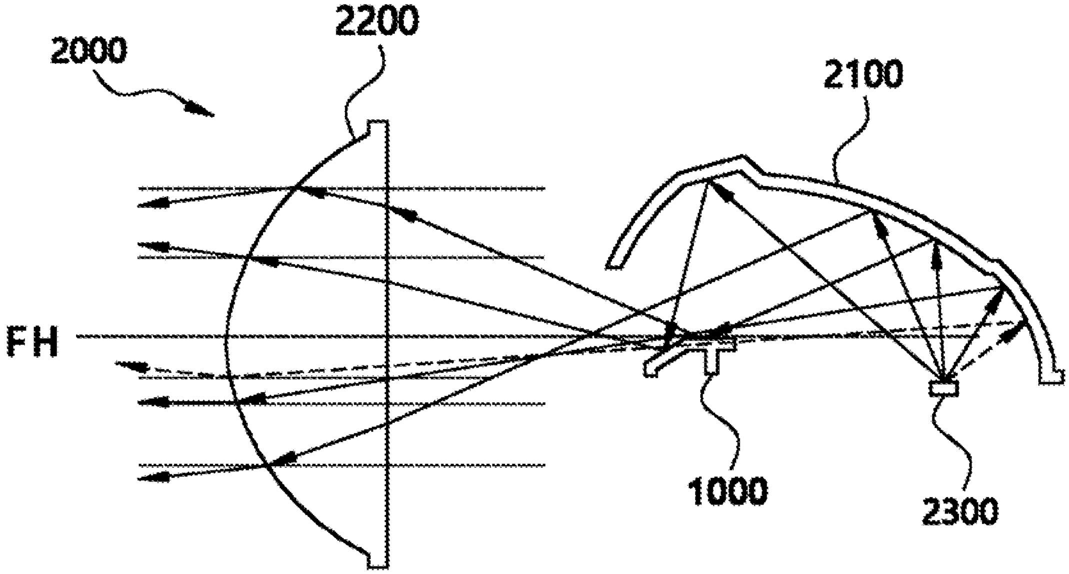
FIG. 1 is a schematic view showing a projection headlamp of the present disclosure.

As shown in FIG. 1, the projection headlamp 2000 of the present disclosure may include a light source 2300 generating light. The light source 2300 may be an LED lamp. In addition, the projection headlamp 2000 of the present disclosure may include a reflector 2100 receiving light from the light source 2300 and transmitting light to an aspherical lens 2200, and the aspherical lens 2200 receiving light from the light source 2300 by the reflector 2100 and transmitting light to the outside. Here, the reflector 2100 may cover all of a light generation area of the light source 2300. The projection headlamp 2000 of the present disclosure may include the shield 1000 for improving dark parts between the reflector 2100 and the aspherical lens 2200, thereby blocking upward light passing through the aspherical lens 2200, and causing light output from the projection headlamp 2000 to be emitted downward. Accordingly, the projection headlamp 2000 may prevent a driver's view from being obstructed as strong light is emitted to the driver's view.

Figure 2:
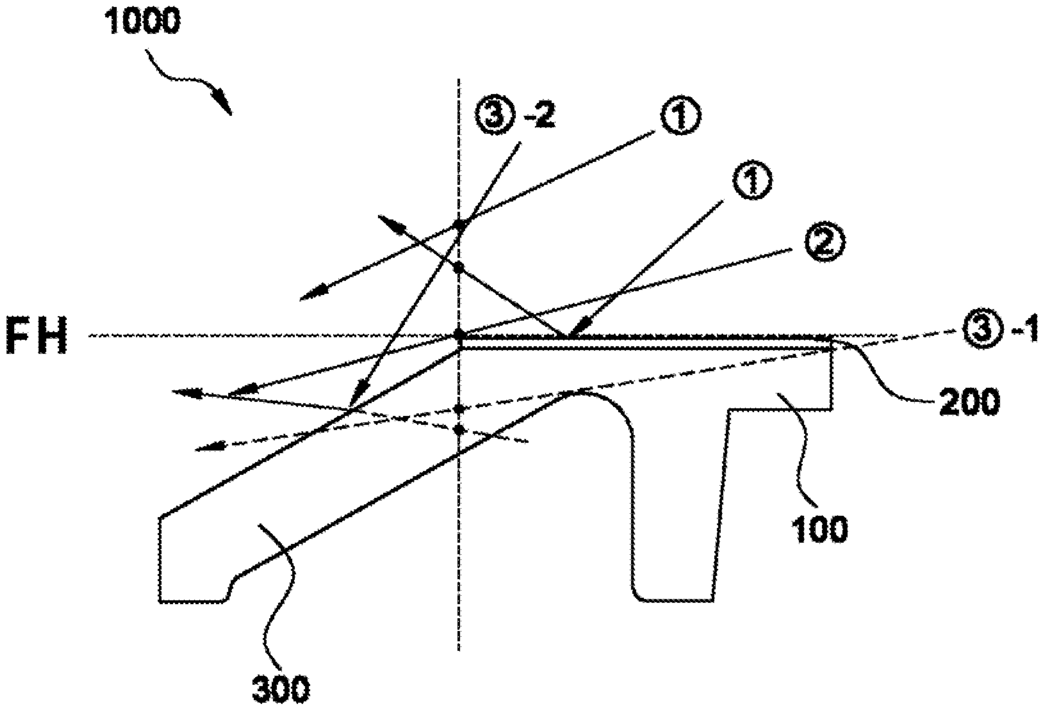
FIG. 2 is a schematic view showing a shield for improving dark parts of the present disclosure and its function.

In more detail, as shown in FIG. 2, the shield 1000 for improving dark parts of the present disclosure may be disposed between the reflector 2100 and aspherical lens 2200 of the lamp to control a light emission area not to be upward.

The shield 1000 for improving dark parts of the present disclosure may include a first shield part 100 including a shield surface 110 disposed at the same height as a focal height FH of the aspherical lens 2200, and a second shield part 200 protruding from the shield surface 110 to provide a dark part D in a predetermined generation area of the dark part D. The second shield part 200 may be integrated with the first shield part 100, or detachable from the first shield part 100, and its position and angle may be adjusted on the shield surface 110 of the first shield part 100. The shield 1000 may include the first shield part to thus block light incident at a height lower than that of the shield surface 110 of the first shield, thereby providing a cut-off. In addition, the shield 1000 may include the second shield part to thus provide a very small dark part D on a cut-off surface, thereby preventing light from concentrating on the cut-off surface.

In addition, the shield 1000 for improving dark parts of the present disclosure may include a reflection part 300 including a reflecting surface 310 in contact with one end of the first shield part 100 while having a predetermined angle with the shield surface 110. The shield 1000 may include the reflection part 300 to thus allow light emitted much higher than the focal height FH of the aspherical lens 2200 to be partially reflected through the reflector 2100, incident on the reflecting surface 310, and then emitted to the aspherical lens 2200. Accordingly, the shield 1000 may direct a very small amount of light upward to enhance visibility of a sign or the like positioned above the driver's view.

In more detail, light emitted passing through an area above a focal point of the aspherical lens 2200, such as light ① of FIG. 2, may be reflected by the reflector 2100, then pass through without meeting the first shield part 100 or the second shield part 200, and be transmitted downward the focal point of the aspherical lens 2200. In addition, light passing through the vicinity of the focal point of the aspherical lens 2200, such as light ② of FIG. 2, may pass through the shield surface 110 at a height slightly higher than the shield surface 110 to be transmitted to the aspherical lens 2200, or be blocked by the shield surface 110 at a lower height than the shield surface 110. Accordingly, the shield 1000 may have the cut-off configured as above. In addition, light passing through an area below the focal point of the aspherical lens 2200, such as light ③-1 of FIG. 2, may be blocked by the first shield part. Light emitted much higher than the focal height FH of the aspherical lens 2200, thus directed downward at a large angle by the reflector 2100, and meeting the reflecting surface 310 of the shield 1000 for improving dark parts and the area below the focal point of the aspherical lens 2200, such as light ③-2, may be reflected by the reflector 2100 and partially emitted to an upper side of the cut-off. Accordingly, the shield 1000 may enhance the visibility of the sign positioned above the driver's view.

In addition, the present disclosure's shield 1000 for improving dark parts may include a dark part improvement means. The dark part improvement means may induce light to be diffused to the generation area of the dark part D. Here, the dark part D may be caused by the second shield part 200, or generated by the dark part improvement means itself. The shield 1000 may include the dark part improvement means to thus prevent light from concentrating on a light blocking cut-off and preventing the dark part D protruding from the cut-off from being recognized by the driver, thereby improving usability.

Hereinafter, the description describes a first embodiment of the dark part improvement means of the present disclosure in more detail with reference to FIGS. 3 and 4.

Figure 3:
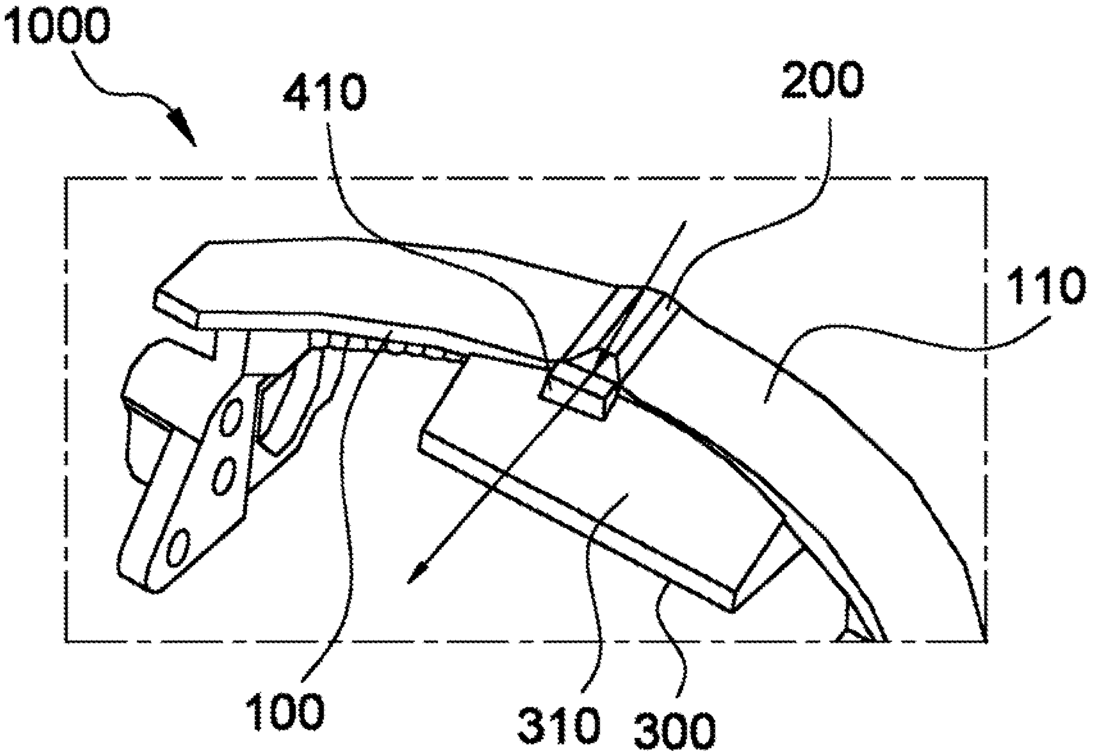
FIG. 3 is a perspective view of a first embodiment of a dark part improvement means of the present disclosure.

As shown in FIG. 3, the dark part improvement means may include a light guide 410 attached to the reflecting surface 310 of the reflection part 300 and having one end in contact with one end of the second shield part 200. Here, one end of the second shield part 200 may be its end disposed toward the aspherical lens 2200, and the other end of the second shield part 200 may be its end disposed toward the light source 2300. The light guide 410 may be made of a material that may reflect light. Accordingly, light incident on the second shield part 200 may be partially transmitted toward the aspherical lens 2200 by being incident on the light guide 410, and light may be partially emitted to an area of the dark part D formed by the second shield part.

Figure 4:
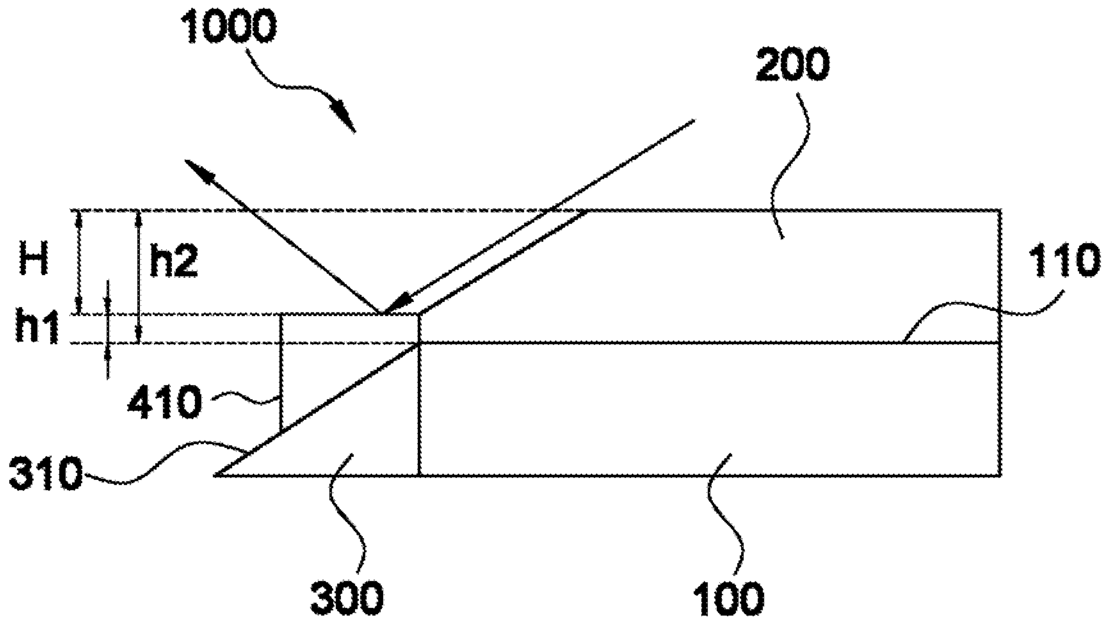
FIG. 4 is a plan view of a first embodiment of the dark part improvement means of the present disclosure.

Here, as shown in FIG. 4, the maximum height of the light guide 410 may be higher than the shield surface 110 and lower than the maximum height of the second shield part 200. In addition, the second shield part 200 may have an incline formed on its side in contact with the light guide 410, and one end of the second shield part 200 and one end of the light guide 410 may have the same height. Here, an angle between the incline of the second shield part 200 and the shield surface 110 may be 15 degrees to 20 degrees. As the light guide 410 having such specifications is installed, light incident along the incline of the light guide 410 may be incident on the light guide 410 and reflected to the aspherical lens 2200.

In more detail, a height difference h1 between the maximum height of the light guide 410 and the shield surface 110 may be lower than a height difference h2 between the maximum height of the second shield part 200 and the shield surface 110 by a predetermined height H. Here, H may be about 50% to 55% of h2. In more detail, h1 may be 0.35 mm or more and less than 0.45 mm, and h2 may be 0.8 mm or more and less than 0.9 mm. In addition, a range of H, which is a difference between h1 and h2, may be 0.35 mm or more and less than 0.55 mm. Such specifications may be easily changed and applied within the above-described ranges based on specifications of the aspherical lens 2200, the reflector 2100, and the light source 2300.

In addition, a width of the light guide 410 may be smaller than a width of the second shield part 200 (or a width of the dark part D). In more detail, the width of the light guide 410 may be 60% to 65% of the width of the second shield part 200. In more detail, the width of the second shield part 200 may be 5 mm or more and less than 5.5 mm, and the width of the light guide 410 may be 3 mm or more and less than 4 mm. Such specifications may be easily changed and applied within the above-described ranges based on the specifications of the aspherical lens 2200, the reflector 2100, and the light source 2300.

The shield 1000 may include the light guide 410 having these specifications to thus allow light reflected by the light guide 410 to be partially incident on the generation area of the dark part D that is formed by the second shield part 200, thereby blurring the dark part D.

In addition, in an embodiment, the light guide 410 may have substantially the same width as that of the second shield part 200. In addition, the light guide 410 may have another cut-off surface facing the cut-off surface of the second shield part 200. That is, the cut-off surface of the second shield part 200 and the cut-off surface of the light guide 410 may form a V-shape when viewed from the side. Accordingly, an amount of light reflected by the light guide 410 may be partially reduced to thus prevent the light concentration. The shield 1000 may adopt an embodiment of the light guide 410 to thus allow light reflected by the light guide 410 may be emitted to an entire generation area of the dark part D that is formed by the second shield part 200, and the generation area of the dark part D and a non-generation area of the dark part D to be smoothly connected with each other.

Hereinafter, the description describes a second embodiment of a dark part improvement means of the present disclosure in more detail with reference to FIGS. 5 to 8.

Figure 5:
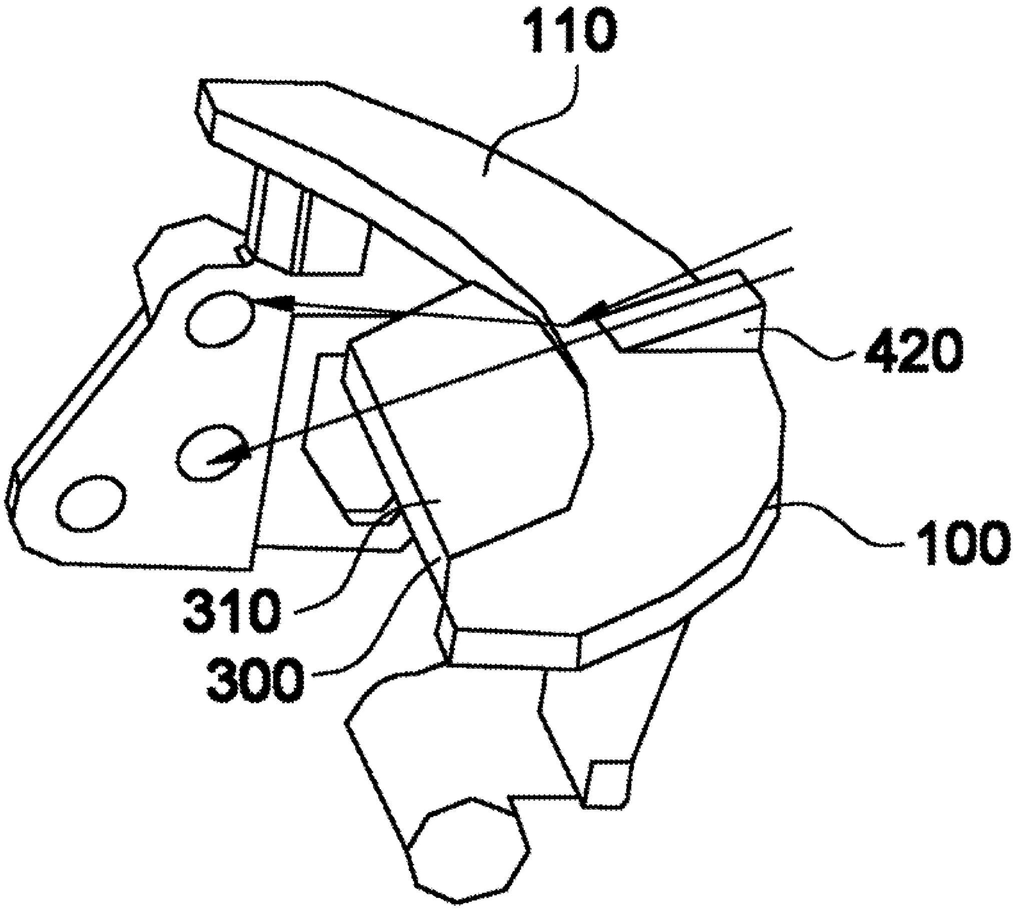
FIG. 5 is a perspective view of a second embodiment of a dark part improvement means of the present disclosure.

As shown in FIG. 5, in a second embodiment of the dark part improvement means of the present disclosure, the dark part improvement means may include an additional shield 420 installed on the shield surface 110. Here, one end of the first shield part 100 may be its corner disposed toward the aspherical lens 2200, and the other end of the first shield part 100 may be its corner disposed toward the light source 2300. The additional shield 420 may be coupled to the shield surface 110 while having one end facing one side of the first shield part 100 and the other end facing the other end of the first shield part 100.

Figure 6:
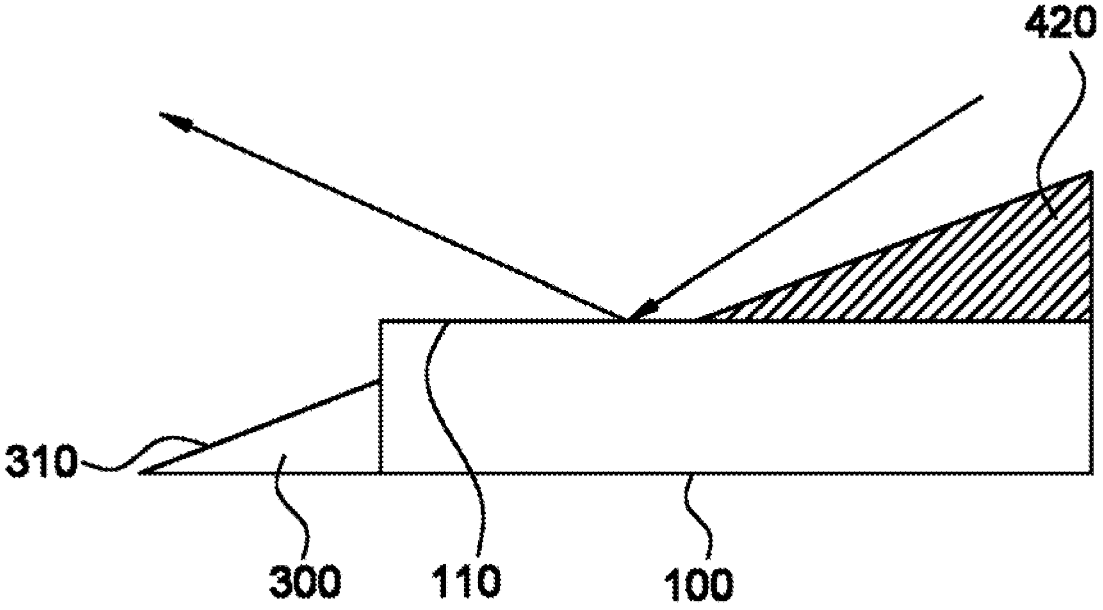
FIGS. 6 and 7 are plan views of a second embodiment of the dark part improvement means of the present disclosure.

In more detail, as shown in FIG. 6, the additional shield 420 may have a shape similar to a triangular prism, and one of its side surfaces may be coupled to the shield surface 110. The additional shield part 420 may be integrated with the shield surface 110, or detachable from the first shield part 100, and its position and angle may be adjusted on the shield surface 110 of the first shield part 100.

Accordingly, the dark part D may be provided by blocking light by the first shield part 100 and the additional shield 420 when light is incident at a height lower than the height of the additional shield 420 or when light is incident on the side surface of the additional shield 420. In addition, the dark part D may be improved when light is transmitted to and reflected from the front of the additional shield 420, that is, a portion of its surface that has the same height as the first shield part 100, or when the light passes through the additional shield 420 while being close to an end of the additional shield 420. In addition, the shield 1000 may increase far-field road surface performance by allowing light to be incident on and reflected from the side surface of the additional shield 420 and then transmitted to the center of the first shield part 100, and finally adding light to a central part of a light generation area of the light source 2300.

Figure 7:
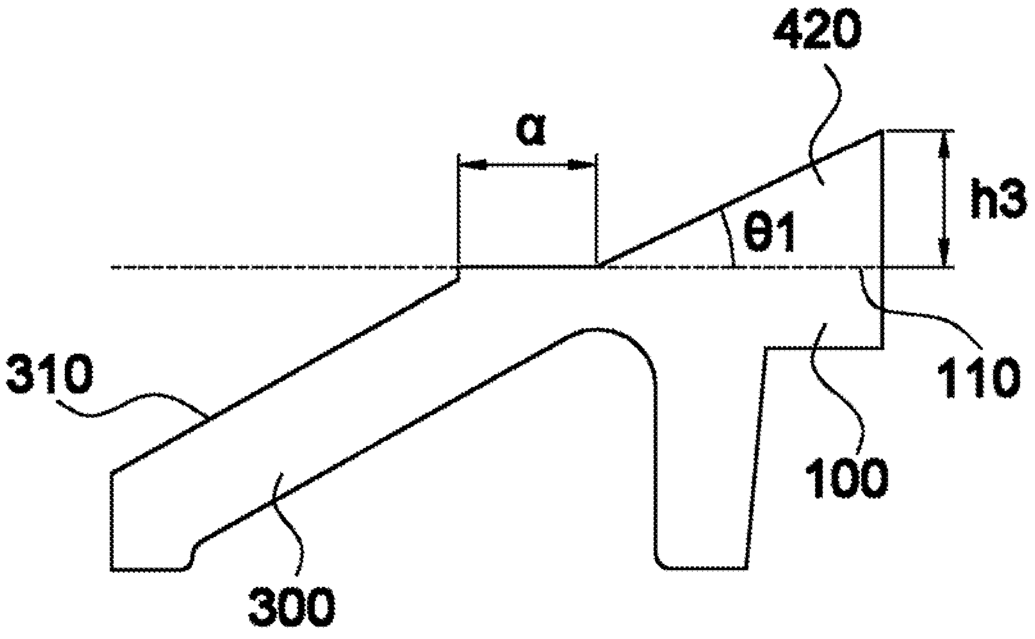

Here, as shown in FIG. 7, the additional shield 420 may have an angle of θ1 formed between planes configuring one of its end corners to be 10 degrees to 30 degrees. In addition, a height difference h3 between the maximum height of the additional shield 420 and the shield surface 110 may be 0.5 mm to 1 mm.

In addition, one end of the additional shield 420 may be spaced apart from one end of the shield surface 110 by a predetermined distance a, and the other end of the additional shield 420 may match the other end corner of the shield surface 110. In this way, the additional shield 420 may be spaced apart from one of end corners of the first shield part 100 to secure a space where light may be reflected. Here, α may be 1.5 mm or more and less than 2.5 mm.

Figure 8:
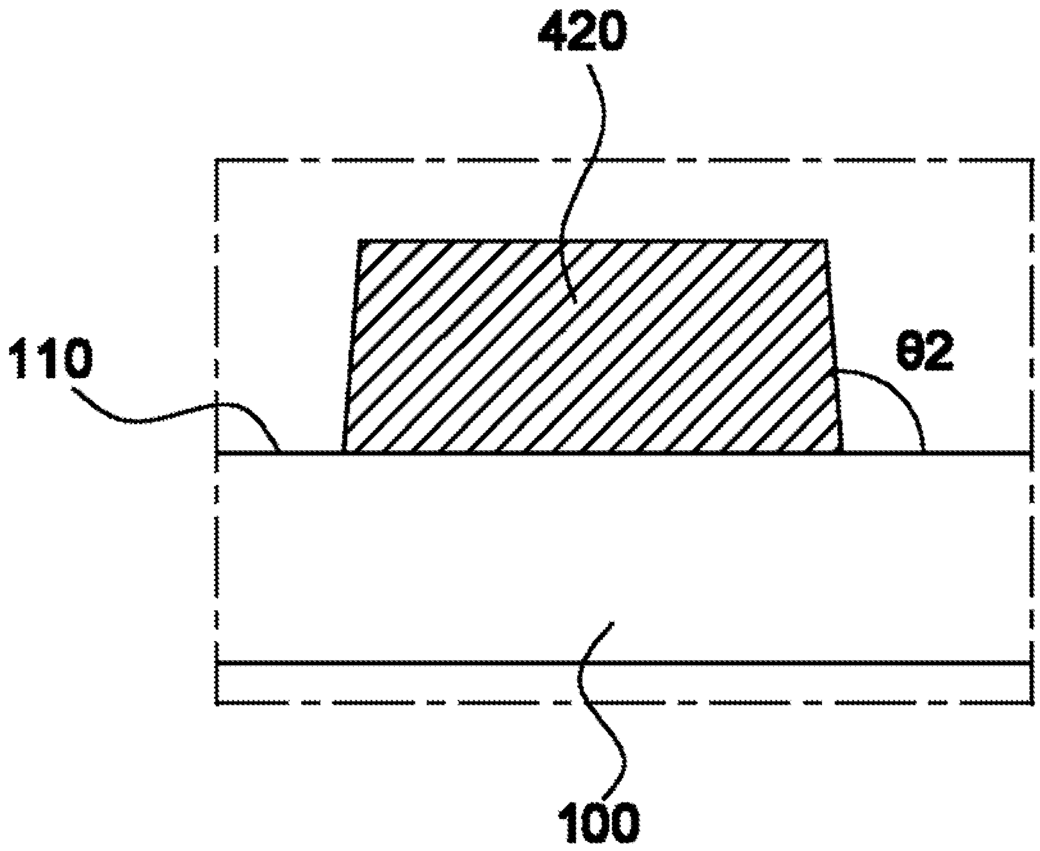
FIG. 8 is a cross-sectional view of a second embodiment of the dark part improvement means of the present disclosure.

In addition, as shown in FIG. 8, the additional shield 420 may have a width at the maximum height smaller than a width at the minimum height. That is, the additional shield 420 may have both side walls each having a certain angle tilted inward. Here, an angle θ2 between the shield surface 110 and the sidewall of the additional shield 420 may range from 93 degrees to 100 degrees. Accordingly, this open angle may allow light incident at a height similar to that of the additional shield 420 to be partially transmitted to the aspherical lens 2200, thereby increasing light efficiency.

The shield 1000 may include the additional shield 420 having such specifications to thus provide the dark part D by blocking light by the first shield part 100 and the additional shield 420 when light is incident at the height lower than the height of the additional shield 420, or when light is incident on the side surface of the additional shield 420, improve the dark part D by controlling light of the light source 2300 so that light is transmitted to and reflected from the front of the additional shield 420, that is, the portion of its surface that has the same height as the first shield part 100, or the light passes through the additional shield 420 while being close to the end of the additional shield 420, and increase the far-field road surface performance by allowing light to be incident on and reflected from the side surface of the additional shield 420 and then transmitted to the center of the first shield part 100, and finally adding light to the central part of a light generation area of the light source 2300.

As set forth above, the projection headlamp of the present disclosure having the above configuration may improve the driver's driving stability by optimizing the shield design to add some light to the dark part or advancing light blocked for providing the dark part to the far-field part which is advantageous for the driving.

The spirit of the present disclosure should not be limited to the embodiments described above. The present disclosure may be applied to various fields, and may be variously modified by those skilled in the art without departing from the scope of the present disclosure claimed in the claims. Therefore, it is obvious to those skilled in the art that these alterations and modifications fall within the scope of the present disclosure.

What is claimed is:

1. A shield for improving dark parts in a light emission area of a lamp, wherein the shield is disposed between a reflector and an aspherical lens of the lamp to control light emission area, the shield comprising:

a first shield part including a shield surface disposed at a same height as a focal height of the aspherical lens;

a reflection part including a downward sloping reflecting surface in contact with one end of the first shield part and having a predetermined angle with respect to the shield surface to slope downward from the one end of the shield surface; and a dark part improvement element including a light guide located on the downward sloping reflecting surface and configured to diffuse light to a predetermined generation area of the dark part in the light emission area.

2. The shield of claim 1, further comprising a second shield part positioned on the shield surface of the first shield part and configured to provide the dark part in the predetermined generation area of the dark part, wherein the light guide has one end in contact with one end of the second shield part.

3. The shield of claim 2, wherein a maximum height of the light guide is greater than that of the shield surface and lower than that of the second shield part.

4. The shield of claim 3, wherein the second shield part has an incline formed on a side of the second shield part in contact with the light guide, and the one end of the second shield part and the one end of the light guide have are of a common height.

5. The shield of claim 4, wherein a width of the light guide is less than a width of the second shield part.

6. A shield for improving dark parts in a light emission area of a lamp, wherein the shield is disposed between a reflector and an aspherical lens of the lamp to control light emission area, the shield comprising:

a first shield part including a shield surface disposed at a same height as a focal height of the aspherical lens;

a reflection part including a reflecting surface in contact with one end of the first shield part and having a predetermined angle with respect to the shield surface; and a dark part improvement element configured to diffuse light to a predetermined generation area of the dark part in the light emission area, wherein;

the dark part improvement element includes an additional shield coupled to the shield surface of the first shield part, and has one end facing one side of the first shield part and another end facing an other end of the first shield part, and a height of the one end of the additional shield is less than that of the other end of the additional shield.

7. The shield of claim 6, wherein the additional shield is of a triangular prism shape, and one of its side surfaces is coupled to the shield surface of the first shield part.

8. The shield of claim 7, wherein the additional shield is at an angle, between planes configuring one of its end corners, of from 10 degrees to 30 degrees.

9. The shield of claim 6, wherein the additional shield has a width at a maximum height that is less than a width at a minimum height.

10. The shield of claim 6, wherein the one end of the additional shield is spaced apart from one end of the shield surface by a predetermined distance, and the other end of the additional shield matches an end corner of the shield surface.

11. A projection headlamp comprising:

a light source configured to generate light;

an aspherical lens configured to transmit the generated light of the light source outside of the projection headlamp to a headlamp emission area; and a reflector configured to receive the generated light from the light source, and to transmit the received light to the aspherical lens, and including a shield for improving dark parts in the headlamp emission area, wherein the shield is disposed between the reflector and the aspherical lens, wherein the shield includes:

a first shield part including a shield surface disposed at a same height as a focal height of the aspherical lens;

a reflection part including a downward sloping reflecting surface in contact with one end of the first shield part and having a predetermined angle with the shield surface to slope downward from the one end of the shield surface; and a dark part improvement element including a light guide located on the downward sloping reflecting surface and configured to diffuse light to a predetermined generation area of the dark part in the light emission area.

* * * * *